United States Patent [19]
Martens

[11] 3,771,706
[45] Nov. 13, 1973

[54] APPARATUS FOR WELDING BY TRANSLATIONAL FRICTION

[75] Inventor: Charles H. Martens, Huntsville, Ala.

[73] Assignee: The United States of America as represented by the Secretary of the Army, Washington, D.C.

[22] Filed: Sept. 7, 1971

[21] Appl. No.: 178,225

[52] U.S. Cl............ 228/2, 29/470.3, 156/73
[51] Int. Cl............................. B23k 27/00
[58] Field of Search............ 228/2; 29/470.3, 29/470.1; 156/73

[56] References Cited
UNITED STATES PATENTS

| | | | |
|---|---|---|---|
| 3,235,160 | 2/1966 | Walton | 228/2 |
| 3,460,235 | 8/1969 | Roberts et al. | 29/470.3 |
| 3,469,300 | 9/1969 | Nagin | 29/470.3 |
| 3,542,275 | 11/1970 | Loyd et al. | 29/470.3 |
| 3,581,969 | 6/1971 | Bodine | 29/470.3 X |
| 3,615,968 | 10/1971 | Ceresa et al. | 156/73 |
| 3,699,639 | 10/1972 | Ditto et al. | 228/2 X |
| 2,032,271 | 2/1936 | Enghauser | 29/470.3 |

FOREIGN PATENTS OR APPLICATIONS

| 1,338,739 | 11/1962 | France | 29/470.1 |
|---|---|---|---|

Primary Examiner—Robert D. Baldwin
Assistant Examiner—Robert J. Craig
Attorney—Harry M. Saragovitz et al.

[57] ABSTRACT

Apparatus for welding surfaces of a workpiece or workpieces together by translational welding. The apparatus includes clamping members disposed adjacent the surfaces to be joined, and a member capable of transmitting translational motion to one or both of the surfaces to be joined is secured to the clamping bars. Locating supports are disposed in spaced relation to the workpiece for application of a force thereto to press the surfaces together for welding thereof responsive to the translational movement.

6 Claims, 3 Drawing Figures

PATENTED NOV 13 1973 3,771,706

Charles H. Martens,
INVENTOR.

Harry M. Saragovitz
Edward J. Kelly
Herbert Berl
Harold W. Hilton

BY

3,771,706

APPARATUS FOR WELDING BY TRANSLATIONAL FRICTION

BACKGROUND OF THE INVENTION

Frictional heating, in a typical operation, is provided by relative motion between two materials in contact. Such motion is frequently provided by a rapidly spinning fly wheel which transmits rotary motion to a first workpiece and thrusting the rotating workpiece against a second stationary workpiece. Fly wheel energy is converted to frictional heat and rotary forging to produce a bond between the stationary part and the rotating workpiece. The weld is controlled by fly wheel size, initial speed and thrust pressure. Because of the necessity to rely on rotary movement of at least one of the members to be bonded, the friction welding practice is generally limited to symmetrical members. However, the final solution appears to rest in a friction-joining process which utilizes reciprocating or oscillatory motion to achieve the desired heating. Obviously, such operation would not be limited to only symmetrical workpieces. Additionally, means displacement of only a fraction of an inch is sufficient to generate energy inputs with those required for conventional rotary friction welding of the same materials. Furthermore, by the non-rotary process, it is possible to join large cross-sections of irregular shapes with 100 percent efficiency.

SUMMARY OF THE INVENTION

Apparatus for joining surfaces by non-rotary friction welding, including means for producing oscillatory or vibrational motion connected to the surfaces to be bonded and means for application of a force to the surfaces at a predetermined time responsive to the translational movement of the surfaces during frictional engagement thereof. The device imparts motion to one or both surfaces, as desired.

It is therefore an object of the present invention to provide a method and apparatus for bonding together a pair of surfaces.

It is also an object of the present invention to provide such apparatus and method for bonding together such surfaces which may be either symmetrical or unsymmetrical or of similar or dissimilar masses and shapes.

It is an additional object of the present invention to provide a method and apparatus for bonding such surfaces together through relative translational movement between the surfaces while the surfaces are in engaged relation.

These and other objects and advantages of the invention will be more readily apparent from the following description of the drawing and description of the preferred embodiment.

DESCRIPTION OF THE PREFERRED EMBODIMENT

Figure 1:
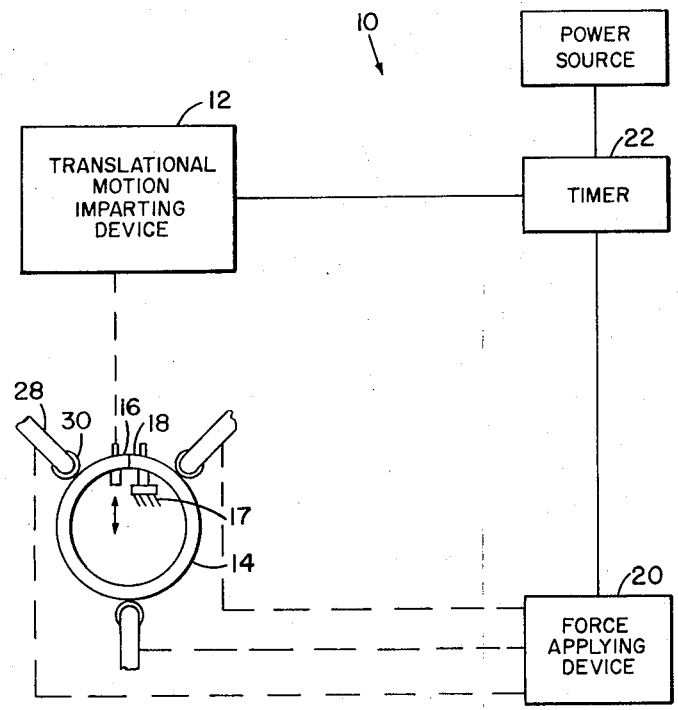
FIG. 1 is a diagrammatic view illustrating the friction welding system of the present invention.

The welding apparatus 10 of the present invention, as shown in FIG. 1, includes a translational motion imparting device 12 connected to a workpiece 14 for imparting translational motion thereto. As shown in FIG. 1, device 12 is only connected to one of surfaces 16 and 18 of the workpiece. However, if desired a pair of motion imparting devices 12 may be connected to both surfaces 16 and 18 for movement of both of the surfaces. The motion transmitting device 12 may be any of many devices for transmitting oscillatory or reciprocating motion to a member and, therefore, may be of a mechanical origin (cam type) or electrical type (transducer). A force applying device 20 is connected to workpiece 14 for application of a force thereto at a predetermined moment. A timer 22 may be utilized for actuation of force applying device 20 and simultaneous deenergization of motion transmitting device 12.

Figure 2:
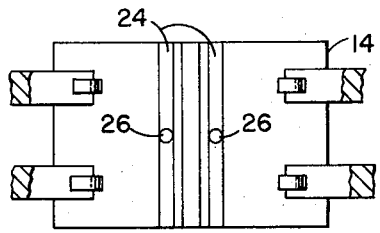
FIG. 2 is an elevational view of the workpiece and clamping bars therefor.

As shown in FIG. 2, the workpiece 14 may be a single rolled sheet having clamping bars 24 adjacent surfaces 16 and 18 thereof. The edges of the workpiece are disposed in longitudinally extending parallel relation. Bars 24 are provided with connecting means 26 for connecting the workpiece to translational motion transmitting device 12.

Figure 3:
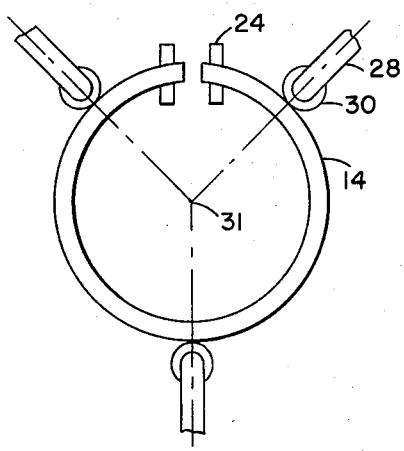
FIG. 3 is an elevational end view of the workpiece and the support and force applying members therefor.

Workpiece 14, shown in FIG. 3 as a rolled sheet, is disposed in engaged relation with a plurality of radially disposed locating supports 28 acting through the longitudinal axis 30 of the rolled sheet. The locating supports include rollers 30. If desired, sliding bars (not shown) may be utilized instead of rollers 30. The locating supports are connected to force applying device 20 (FIG. 1) which may be a hydraulic ram or any of many available equivalent hydraulic, mechanical or electrical or combined force applying devices.

In operation, motion transmitting device 12 is connected to one or both of surfaces 16 and 18. The surfaces 16 and 18 are disposed in engaged relation at a predetermined pressure. The pressure is applied by force device 20 through locating supports 28. In the embodiment shown in FIG. 2, surface 16 is connected to motion transmitting device 12 and surface 18 is rigidly secured to a stationary support 17. Actuation of translational motion transmitting device 12 imparts oscillatory or reciprocating motion to surface 16 for the friction welding. At a predetermined time, when metallurgical bonding is to be accomplished, timer 22 deenergizes motion transmitting device 12 and substantially simultaneously actuates force supplying device 20 to apply an additional force to workpiece 14 for bonding of the surfaces.

It may be beneficial, in some instances, to apply supplemental heat from a propane torch or the like. This procedure is particularly useful when bonding together dissimilar metals or metals that exhibit brittle behavior at room temperature. Supplemental heating is also useful when joining a small member to a massive member.

It is to be understood that while the above discussion relates to the joining of the edges of a rolled sheet, this is only illustrative and not limiting. Obviously, a pair of plates may be joined as well as the edges of a rolled sheet. If desired the plates may have a plurality of appendages welded thereto by the translational welding device and method of the present invention. Such appendages may be of different sizes, shapes (straight, semi-cylindrical, etc.) and of similar or dissimilar materials. The workpiece may be in the form of a cylinder, if desired, and by the translational welding procedure set forth, supra, small appendages may be advantageously welded to the cylindrical workpiece since the appendages will conform to the shape of the cylindrical workpiece. Additionally, it can be understood, that the movement between the surfaces to be joined may be very small. Thick pieces or movement of a small piece in contact with a large piece may allow relative motion of much greater dimensions. A flux of any composition may be employed, if desired.

I claim:

1. Apparatus for welding a pair of longitudinally extending parallel disposed surfaces of a workpiece together comprising:
   a. translational motion transmitting means for imparting translational motion to at least of said surfaces for relative motion between said surfaces;
   b. support means for support of said surface;
   c. force applying means for retaining said surfaces in contact during the motion thereof and for further application of a force of predetermined magnitude subsequent to the translational movement of the surfaces; and
   d. timing means for deenergization of said motion transmitting means at a predetermined time for substantially simultaneous actuation of said force applying device responsive to deenergization of said motion transmitting device.

2. Apparatus as in claim 1 including clamping means disposed adjacent each of said surfaces, and connecting means disposed on said clamping means for secured relation thereof with said translational motion device.

3. Apparatus as in claim 2 wherein said force applying means includes support and locating members disposed in engaged relation with said workpiece; and, a hydraulic ram device in secured relation with said members.

4. Apparatus as in claim 3 wherein said translational motion transmitting device is disposed for producing oscillatory motion.

5. Apparatus as in claim 3 wherein said translational motion transmitting means is disposed for producing vibrational motion.

6. Apparatus as in claim 3 wherein said workpiece is a rolled sheet and said pair of surfaces are the ends of said rolled sheet; and, said support and locating members include a plurality of arms having rollers on the distal ends thereof for engaged relation with saideet, said arms being radially disposed about said rolled sheet.

* * * * *